United States Patent [19]

Stupak, Jr.

[11] Patent Number: 4,751,459
[45] Date of Patent: Jun. 14, 1988

[54] MAGNETIC TACHOMETER OR ACCELEROMETER HAVING HIGHLY PERMEABLE EDDY CURRENT FLUX CIRCUIT

[75] Inventor: Joseph J. Stupak, Jr., Portland, Oreg.

[73] Assignee: Synektron Corporation, Portland, Oreg.

[21] Appl. No.: 909,762

[22] Filed: Sep. 18, 1986

[51] Int. Cl.⁴ .......................... G01P 3/46; G01P 3/52; G01B 7/14
[52] U.S. Cl. .................................... 324/164; 324/208; 73/519
[58] Field of Search ............... 324/207, 208, 173, 174, 324/164; 318/693, 397; 361/236, 239; 340/669, 670, 671; 73/519, 520

[56] References Cited

U.S. PATENT DOCUMENTS

| | | | |
|---|---|---|---|
| 3,229,202 | 1/1966 | Wenk | 324/164 |
| 3,359,442 | 12/1967 | Kunrt et al. | 324/252 |
| 3,932,813 | 1/1976 | Gallant | 324/164 |
| 4,439,728 | 3/1984 | Rickman, Jr. | 324/164 |
| 4,441,077 | 4/1984 | Dodgen et al. | 324/164 |

FOREIGN PATENT DOCUMENTS 1209780  10/1962  Fed. Rep. of Germany .

Primary Examiner—Reinhard J. Eisenzopf
Assistant Examiner—Walter E. Snow
Attorney, Agent, or Firm—Chernoff, Vilhauer, McClung & Stenzel

[57] ABSTRACT

A tachometer or accelerometer features a nonmagnetic, electrically-conductive, moving member whose velocity or rate of change of velocity is to be measured. A magnetic field is generated in a direction generally perpendicular to the direction of motion, creating eddy currents in the moving member which, in turn, create an eddy current magnetic field. The flux density of the eddy current field is measured by a Hall effect sensor to produce a signal representative of velocity or, alternatively, the rate of change of flux density of the eddy current field is measured by a coil producing a signal representative of the rate of change of velocity. A separate magnetic circuit for the Hall effect sensor or coil sensor, as the case may be, is provided so as to maximize the strength of the eddy current field by concentrating the sensed eddy current flux and thereby maximizing the device's sensitivity and accuracy while minimizing its susceptibility to error through interference.

4 Claims, 1 Drawing Sheet

U.S. Patent  Jun. 14, 1988  4,751,459
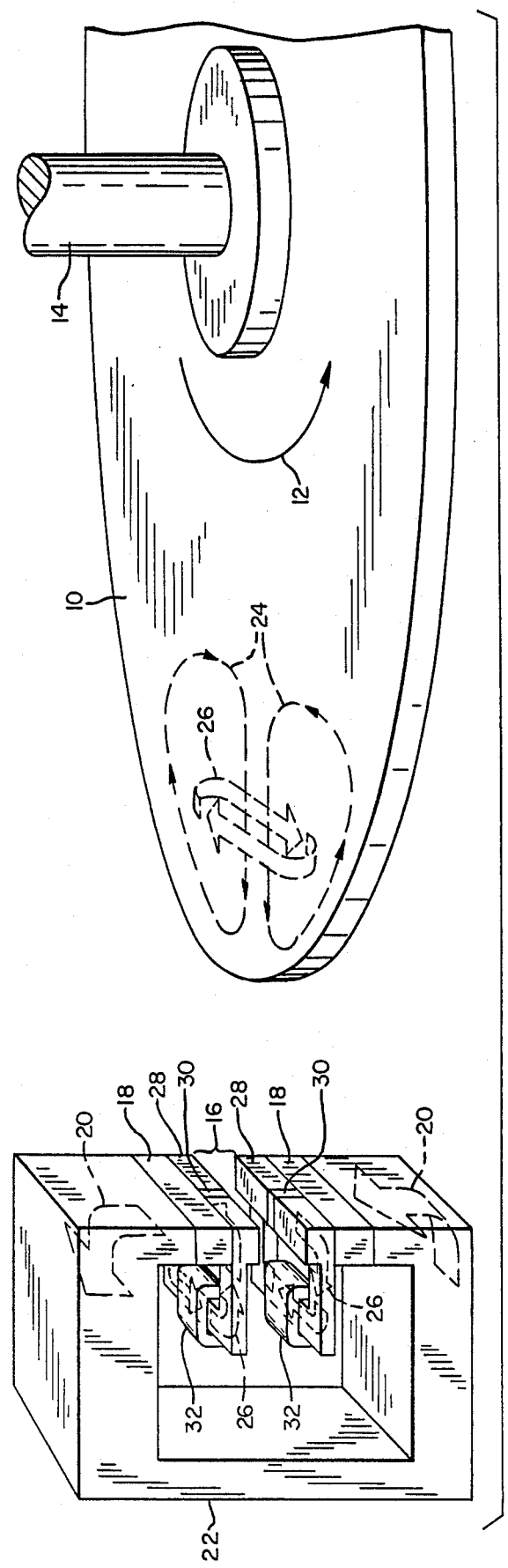
FIG. I
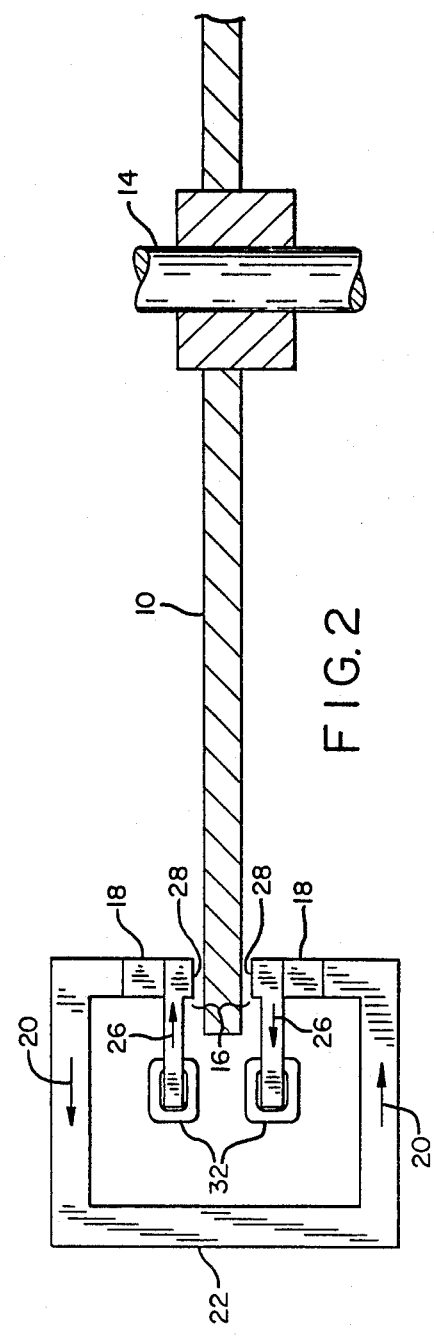
FIG. 2

MAGNETIC TACHOMETER OR ACCELEROMETER HAVING HIGHLY PERMEABLE EDDY CURRENT FLUX CIRCUIT

BACKGROUND OF THE INVENTION

The present invention relates to improvements in tachometers and accelerometers, and particularly to such devices which sense velocity or rate of change of velocity from eddy current magnetic fields.

Devices for sensing the velocity of a non-magnetic, electrically-conductive, moving member by inducing eddy currents therein and sensing the strength of the resultant eddy current magnetic field have long been known. Such devices are exemplified by Kuhrt et al. U.S. Pat. No. 3,359,492, Dodgen et al. U.S. Pat. No. 4,441,007, and German published patent application No. 1,209,780, all of which utilize Hall effect sensors to sense the flux density of the eddy current field whose magnitude is directly proportional to the velocity of the moving member. The German reference also discloses sensing the rate of change of the flux density of the eddy current field using a coil, and thereby employing the device as an accelerometer.

In contrast, eddy current-type velocity sensors utilizing coils as field sensors and sensing velocity by detecting the frequency of passing eddy current fields, rather than the magnitude of their flux densities, have also been known as exemplified by Gallant U.S. Pat. No. 3,932,813 and Rickman, Jr. U.S. Pat. No. 4,439,728.

A problem with all of the foregoing devices is that they lack adequate magnetic circuit structures for their magnetic field sensors, and therefore are forced to sense a weak eddy current field. Because the eddy current field is not inherently strong, the magnitude of the eddy current flux density at the sensors is too low for sensing with an acceptable degree of reliability in the presence of interference from random noise and other stray potentials. The resultant low degree of sensitivity of the devices is particularly problematical in devices such as those of the Kuhrt et al., Dodgen et al., and German references which rely on detection of the relative magnitude of the eddy current flux density to produce a velocity-representative output signal.

The structural deficiency of all of the prior devices, which is primarily responsible for the probleof low sensitivity, is that the Hall or coil-type flux sensor is not incorporated into a high permeability magnetic circuit for collecting and concentrating eddy current flux to be detected by the sensor. In Kuhrt et al. the only magnetic circuit which includes the Hall sensor also includes the source magnets for the main magnetic field which, unless of a highly permeable permanent magnet material such as Alnico, would simply constitute gaps in the circuit, thereby precluding the use of all modern magnets having high energy products and high resistance to demagnetization, but low permeability, such as the ferrite and rare earth cobalt magnets. The comparable magnetic circuits of the other prior devices all contain large air gaps through which the moving member passes, thereby precluding a circuit of high permeability.

Moreover, where the only magnetic circuit available for the magnetic field sensors includes permanent magnets, as in Kuhrt et al. and Dodgen et al., a large number of boundaries of low permeability exist between the various components of the magnetic circuit, thereby further reducing its overall permeability and its effectiveness to concentrate the flux sensed by the sensor. In addition, the sensed eddy current flux is superimposed on the flux of the main permanent magnet field in such devices, thus worsening the reliability factor because of expected variations in the permanent magnet field.

SUMMARY OF THE INVENTION

The present invention solves the problems of low sensitivity and susceptibility to interference characterizing prior eddy current-type velocity and acceleration measuring systems by providing a magnetic circuit for the eddy current field sensors having a loop-shaped flux path which is both highly permeable and exclusive of the flux of the permanent magnets or other source of magnetomotive force which generate the main magnetic field. Preferably, the flux path is composed of highly permeable magnetic material with no more air gaps and no greater number of low-permeability boundaries than are necessary to interface the flux path with the field sensor. The ring-like magnetic circuit acts as a flux collector and increases the magnitude of the eddy current flux which can be sensed by the field sensor, greatly improving its sensitivity while reducing its susceptibility to interference.

Sensitivity and reliability are further improved by orienting the field sensor so that it senses the eddy current flux transversely to the flux of the main field, and therefore cannot sense the main field so that it is not susceptible to variations therein.

The features of the present invention are applicable to eddy current-type velocity or acceleration sensors of either the rotary or linear type. In the rotary type, the moving member would normally be an electrically-conductive, preferably non-magnetic, solid disc, while in the linear type the moving member would be an electrically-conductive, preferably non-magnetic, solid bar or strip. Copper or aluminum are nonexclusive examples of non-magnetic materials suitable for the moving member. There may also be applications where the use of a magnetically permeable moving member, of steel or other electrically conductive material, would be advantageous.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1 is an exploded, partial perspective view of an exemplary embodiment of a rotary-type tachometer/accelerometer constructed in accordance with the present invention.

FIG. 2 is a partial side view of the device of FIG. 1, showing the components in their assembled, operational relationship.

DETAILED DESCRIPTION OF THE INVENTION

The figures depict a rotary-type tachometer/accelerometer constructed in accordance with the present invention. The device comprises an electrically-conductive, solid moving member or disc 10, rotating in a direction 12 in unison with a shaft 14 whose angular velocity or rate of change of velocity is to be measured. A corresponding linear version of the same device would simply replace the disc 10 and shaft 14 with an electrically-conductive, solid moving strip moving along the direction of motion to be sensed.

As shown in the assembled drawing of FIG. 2, the peripheral portion of the disc 10 is situated so as to pass through an airgap 16 between a pair of permanent magnets 18 such that a main magnetic field 20 passes through the moving member 10 in a direction generally perpendicular to the direction of motion of the member in the gap 16. A yoke 22 of magnetic material, such as iron, completes the magnetic circuit of the main field magnets 18. As the disc 10 rotates in the direction 12 through the gap 16, the main field 20 induces eddy currents 24 in the conductive material of the disc, which in turn generate an eddy current magnetic field 26. If the disc were moving in the opposite direction, the directions of the eddy currents 24 and the eddy current field 26 would be reversed from that shown in FIG. 1.

Located immediately adjacent the gap 16 on at least one side thereof, and preferably on each opposing side thereof as shown, is a respective flux collector ring 28 of magnetic material, such as iron, defining a flux path in the shape of a loop having at least the portion thereof which is exposed to the main magnetic field 20 oriented substantially perpendicular to the main field. Thus, the flux from the main magnetic field does not pass along the looped flux path of the ring but rather passes perpendicularly through the looped path. Each ring is oriented, however, such that the flux of the eddy current field 26 does pass along the looped flux path of the ring.

Depending upon whether the device is to be used to measure velocity, or acceleration, or both, one or more of several different types of magnetic field sensors can be associated with each ring 28. In the figures, for example, Hall effect sensors 30 or other magnetic field sensors (such as magnetoresistive sensors) are inserted in gaps in the respective rings for sensing velocity, while coils 32 encircle portions of the respective rings for measuring acceleration. Either type of field sensor can be used alone depending upon the function required, or they may be used together to provide both velocity and acceleration sensing.

The Hall effect sensors 30 and coils 32 are oriented such that they sense the flux of the eddy current field 26, passing along the looped flux paths of the respective rings 28, in a direction perpendicular to the direction in which the main field 20 passes through the moving member 10 so that they, as well as the rings 28, are operably isolated from the main field and the flux thereof is not superimposed on the eddy current flux.

The magnitude of the flux density of the eddy current flux passing along the looped flux path of each ring 28 is substantially directly proportional to the velocity of the peripheral portion of the disc 10 as it passes through the gap 16, and thus similarly proportional to the angular velocity of the shaft 14, such that the output voltage of each Hall effect sensor is likewise proportional thereto.

On the other hand, the voltage developed across each coil 32 is substantially directly proportional to the rate of change of the magnitude of the flux density of the eddy current flux with respect to time, and is therefore directly representative of the rate of change of velocity of the shaft 14 with respect to time. The coils 32 thus enable the device to act as an accelerometer.

Although the device will function properly if only a single ring 28 and associated magnetic field sensor are employed on one side of the gap 16, the use of dual ring and sensor assemblies on opposing sides of the gap 16 enables the outputs of the sensors to be summed so that variations in the outputs due to changes of position of the member 10 within the gap, in the direction of the main field 20, are minimized.

The summed and amplified outputs of the Hall effect sensors 30, representing the velocity of the shaft 14, drop to zero and reverse smoothly when the direction of motion of the disc changes. Similarly, the outputs of the coils 32 drop to zero when the velocity is constant and reverse smoothly when acceleration changes to deceleration, and vice versa.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. In a device for providing an electrical signal representative of the velocity or change in velocity of an electrically-conductive, moving member, including main field generating means for generating a first magnetic field passing through said moving member in a direction generally perpendicular to the direction of motion of said moving member so as to create eddy curents in said member which generate a second magnetic field, and a magnetic field sensor for sensing the flux of said second magnetic field and producing a signal responsive to said flux, the improvement which comprises magnetic circuit means associated with said magnetic field sensor comprising a ring of magnetic material defining a looped flux path, said ring being oriented such that the flux of said second magnetic field passes along said looped flux path and said ring being associated with said magnetic field sensor such that said sensor is responsive to the flux passing along said looped flux path, said flux path being substantially free of any gap in the magnetic material thereof not occupied by said magnetic field sensor and being substantially free of any flux of said first magnetic field to which said magnetic field sensor is responsive, said flux path further being free of any gap in the magnetic material thereof enclosing said moving member.

2. The apparatus of claim 1 wherein said magnetic field sensor is oriented so as to sense the flux of said second magnetic field in a direction substantially perpendicular to the direction in which said first magnetic field passes through said moving member.

3. The apparatus of claim 1 wherein said magnetic field sensor and said ring of magnetic material constitute one of a substantially identical pair of assemblies mounted on opposite sides of said moving member.

4. The apparatus of claim 1 wherein said magnetic field sensor comprises means for sensing the relative magnitude of the density of the flux of said second magnetic field and producing a signal representative of said magnitude.

* * * * *

UNITED STATES PATENT AND TRADEMARK OFFICE
CERTIFICATE OF CORRECTION

PATENT NO. : 4,751,459

DATED : June 14, 1988

INVENTOR(S) : Joseph J. Stupak, Jr.

It is certified that error appears in the above-identified patent and that said Letters Patent is hereby corrected as shown below:

Col. 1, line 46    Change "probleof" to --problem of--

Col. 4, line 34    Change "curents" to --currents--

Signed and Sealed this

Thirteenth Day of March, 1990

Attest:

JEFFREY M. SAMUELS

Attesting Officer      Acting Commissioner of Patents and Trademarks